US009969472B1

(12) United States Patent
Buck-Niehaus

(10) Patent No.: US 9,969,472 B1
(45) Date of Patent: *May 15, 2018

(54) MODIFICATION OF TRADITIONAL PROPELLER SHAFT TUNNEL ON A VESSEL HULL

(71) Applicant: Nicholas Buck-Niehaus, Portland, OR (US)

(72) Inventor: Nicholas Buck-Niehaus, Portland, OR (US)

(73) Assignee: Nicholas Buck-Niehaus, Portland, OR (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/968,566

(22) Filed: Dec. 14, 2015

(51) Int. Cl.
| | | |
|---|---|---|
| *B63B 1/08* | (2006.01) | |
| *B63B 1/32* | (2006.01) | |
| *B63H 5/16* | (2006.01) | |
| *B63B 1/18* | (2006.01) | |

(52) U.S. Cl.
CPC ................... *B63H 5/16* (2013.01); *B63B 1/18* (2013.01)

(58) Field of Classification Search
CPC .................................... B63H 5/16; B63B 1/18
USPC ...................... 114/288; 440/68, 69
See application file for complete search history.

(56) References Cited

U.S. PATENT DOCUMENTS

| | | | | |
|---|---|---|---|---|
| 3,650,239 | A * | 3/1972 | Gast .......................... | B63B 1/18 440/69 |
| 4,924,797 | A * | 5/1990 | Solia ......................... | B63B 1/20 114/283 |
| 4,959,032 | A * | 9/1990 | Langenberg ............ | B63B 39/06 114/57 |
| 2014/0102349 | A1 * | 4/2014 | Abella ...................... | B63B 3/38 114/288 |

* cited by examiner

*Primary Examiner* — Anthony D Wiest
(74) *Attorney, Agent, or Firm* — FSP LLC

(57) ABSTRACT

A hull mold of an aquatic vessel may include a keel pad sectional extended from a hull planing surface to a location on the hull mold at which a propeller shaft exits a propeller shaft tunnel at an aft transom edge of the hull mold and/or at a forward portion of the keel pad sectional, with sides of the propeller shaft tunnel formed into directional ports to increase a flow of water into the propeller shaft tunnel.

3 Claims, 13 Drawing Sheets

MODIFICATION OF TRADITIONAL PROPELLER SHAFT TUNNEL ON A VESSEL HULL

BACKGROUND

In a single or multiple inboard power design the use of a propeller tunnel of concave curvature extending from the point of propeller shaft exit from the hull to the transom edge of the vessel at a marginally increasing gradient produces enhanced performance characteristics.

This design (1) decreases the angle of incidence between the main power source and the propeller shaft thus gaining mechanical advantage and increased physical longevity for mechanical components, (2) increases the flow of water concentrated in the area of best advantage for propeller efficiency, and (3) reduces the natural propensity of the spinning propeller to produce air pockets and bubbles known as "cavitation". However these desirable effects are off-set by a number of disadvantages. One of these disadvantages is the effect that the propeller tunnel has on the efficiency of a semi-displacement or planing hull.

Planing hull types provide the vessel with the ability to move on or very close to the surface of the water, thus freeing the hull from the constraints of "hull speed", a condition that slows and limits a vessels' speed proportionately to its hull length, beam and depth as it moves through the water in a plowing motion. The propeller tunnel, when configured into the hull, creates suction that inhibits the movement of the planing hull toward the surface of the water.

Another disadvantage of propeller tunnels in planing hulls relates to the position of the primary propulsion unit. While the propeller tunnel provides improved mechanical efficiency and extends the life of mechanical devices, it utilizes a long propeller shaft and the installation of the necessary support hardware, struts and cutlass bearings. The long propeller shaft and exterior hardware increase the possibility of damage due to encounters with flotsam or during grounding events.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Described herein are embodiments of a hull mold comprising a tapered protrusion into a propeller shaft tunnel that extends from a forward terminus of the propeller tunnel to a point that positions the propeller at an aft edge of the vessel transom in a manner that reduces or eliminates exterior support hardware. Forward edges of the concave propeller tunnel are formed into directional ports that increase the flow of water into the concave propeller tunnel while the sides of the tapered protrusion and remainder of the tunnel are formed to improve water flow through an area of propeller operation. A majority of propulsion machinery is positioned aft of its conventional position and is located in the hull mold to produce a substantially horizontal (e.g., 1-6 degrees from horizontal) alignment of the propulsion machinery, transmission, and propeller shaft. Consequently and unexpectedly, a length of the propeller shaft may be reduced.

The propulsion machinery may be located relative to the vessel transom in a manner conventionally impractical to in-line, inboard propulsion designs. An interior of the hull mold gains a substantial amount of space forward of the propulsion machinery. A surface of the planing hull is molded flat to provide a continuation of the extant planing surfaces and to alleviate a tendency of the concave propeller tunnel to retard the planing ability of the planing hull.

A hull mold of an aquatic vessel may include a keel pad sectional extended from a hull planing surface to a location on the hull mold at which a propeller shaft exits a propeller shaft tunnel at an aft transom edge of the hull mold and/or at a forward portion of the keel pad sectional, with sides of the propeller shaft tunnel formed into directional ports to increase a flow of water into the propeller shaft tunnel.

In some embodiments, the hull mold, the directional ports formed to direct the flow of water around the keel pad sectional on both port and starboard sides of the vessel.

In some embodiments, the hull mold, the keel pad sectional are dimensioned within an approximately ⅓ middle width section of the hull planing surface.

In some embodiments, the hull mold, the keel pad sectional are extended in a taper from the hull planing surface to the location on the hull mold at which the propeller shaft exits the propeller shaft tunnel.

DRAWINGS

Figure 1:
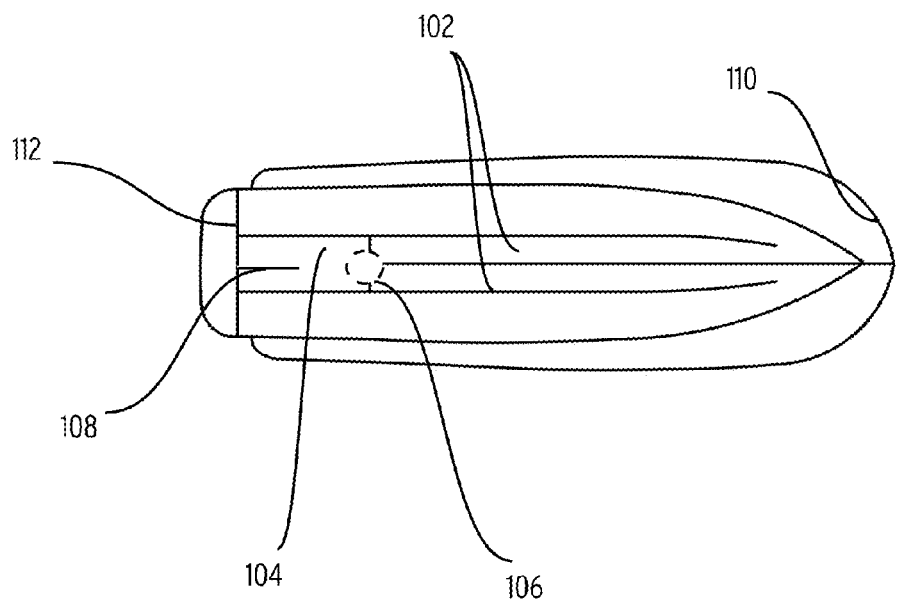
FIG. 1 illustrates an embodiment of a boat molding.

FIG. 1 illustrates a semi-V planing hull 110 design from a bottom view. This design incorporates planing surfaces 102 as well as a keel pad 104 that is positioned over a centerline of the vessel. The keel pad 104 terminates toward the aft quarter of the hull and includes a step 106 into a concave propeller shaft tunnel 108 that extends through the vessel transom 112.

Figure 2:
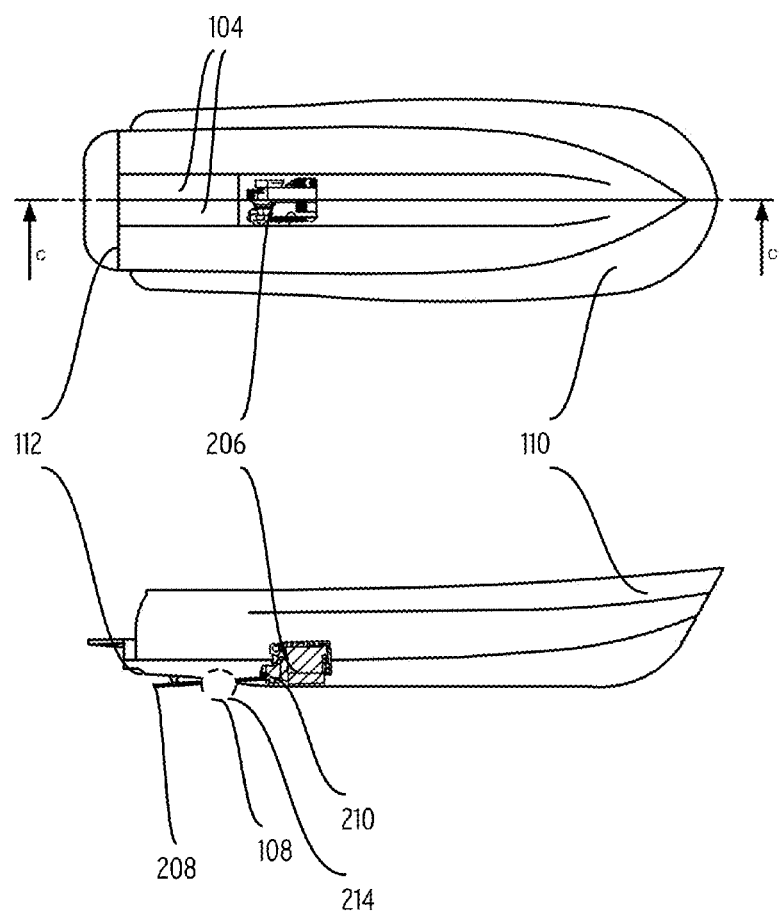
FIG. 2 illustrates the design of FIG. 1 and including a motor and its secondary components.

FIG. 2 illustrates a cutaway side view of an embodiment of a planing hull with the starboard side removed to reveal an in-line, inboard power configuration and inclusive of a concave propeller tunnel.

In conventional designs, an angle of installation for the main propulsion unit 206, transmission 210 and the propeller shaft 208 may vary between eleven and thirteen degrees from horizontal depending upon the choice of machinery that is utilized. The addition of a propeller shaft tunnel 108 to the hull 110 may improve the angle of installation by three to five degrees to approximately eight degrees from horizontal. This conventional configuration may also utilize a cutlass bearing to support the propeller shaft tunnel 108 as it exits the hull 110 and an exterior support, or propeller shaft strut 214, which also comprises a cutlass bearing, located between a point of exit for the propeller shaft from the hull 110 and its terminus in the propeller at the aft transom edge of the vessel transom 112. Should a larger vessel design require multiple main propulsion units, the keel pad 104 may be extended to the vessel transom 112 while the main propulsion machinery (main propulsion unit 206, transmission 210 and propeller shaft 208) and attendant propeller shaft tunnel 108 may be repositioned to a conventional port and starboard configuration.

Figure 3:
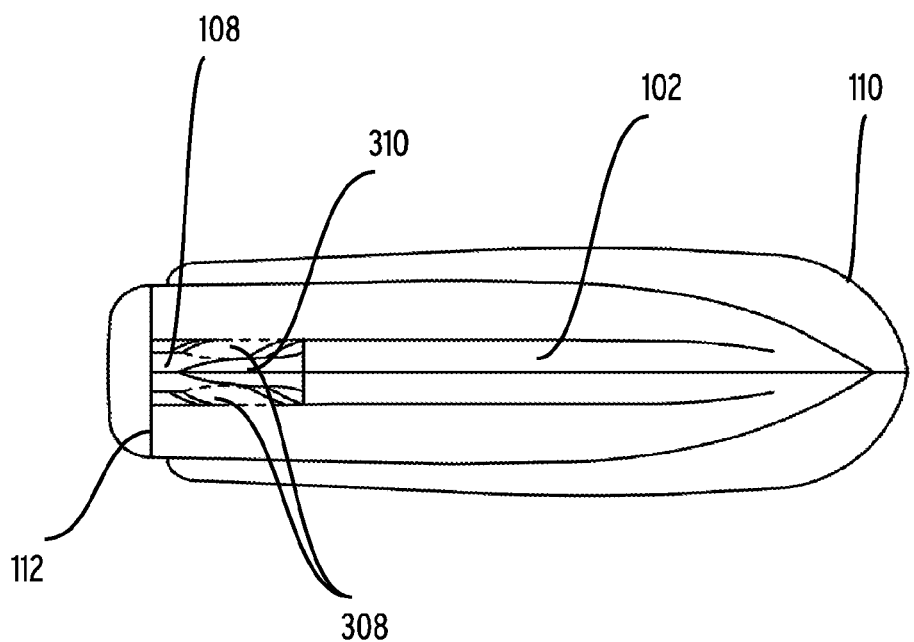
FIG. 3 illustrates a planing hull comprising an enhanced keel pad sectional 310 between the vessel transom 112 and the planing surfaces 102 on the hull 110 of the boat.

FIG. 3 illustrates an enhanced keel pad sectional 310 molded into the bottom of the hull 110. Where the conventional design includes a step 106 (seen in FIG. 1, and FIG. 2) from the keel/planing surfaces 102 into a conventional concave propeller shaft tunnel 108, the enhanced keel pad sectional 310 has been extended from the planing surfaces 102 in a tapered shape that places the propeller within the modified propeller shaft tunnel 108 in a position at the aft transom edge of the vessel transom 112 without the use of an exterior propeller shaft strut 214 (seen in FIG. 2). An integral component of the molding for the enhanced keel pad sectional 310 forms the propeller shaft tunnel 108 to improve its functionality. At the forward portion of the enhanced keel pad sectional 310 the sides of the concave propeller shaft tunnel 108 are formed into directional ports 308 that increase a flow of water into the propeller shaft tunnel 108 and past the enhanced keel pad sectional 310 on both port and starboard sides. The surface of the concave propeller shaft tunnel 108 has been formed to direct this increased water flow through the operational area of the propeller.

In some embodiments, the enhanced keel pad sectional 310 is confined in dimensions to an approximately ⅓ (e.g., within 10% of ⅓) middle width section of the hull 110 surface that contacts the water (see FIG. 3).

Figure 4:
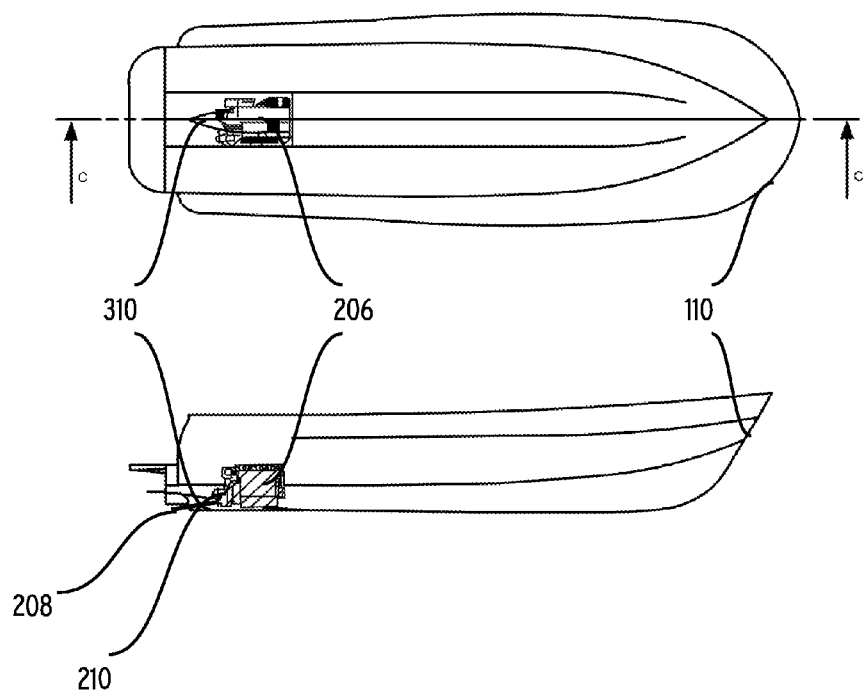
FIG. 4 illustrates a bottom and side view of a boat hull 110 comprising enhanced keel pad sectional 310 that enables aft placement of the propulsion machinery (main propulsion unit 206, transmission 210 and propeller shaft 208).

FIG. 4 illustrates a cutaway side view of an embodiment of a planing hull with the starboard side removed to expose a molded portion of the hull with a position of the propulsion machinery illustrated and a shortened propeller shaft illustrated.

The enhanced keel pad sectional 310 positions the main propulsion unit 206, transmission 210 and propeller shaft tunnel 108 further aft than in a conventional hull design thus eliminating the utilization of a propeller shaft strut 214. The enhanced keel pad sectional 310 also enables the machinery (main propulsion unit 206, transmission 210 and propeller shaft 208) to be positioned in the hull 110 such that an angle of installation between the drive components and relative to the water (and a bottom surface of the hull 110) becomes substantially horizontal (e.g., 1-6 degrees from parallel/horizontal). This improved angle of installation may reduce a length for the propeller shaft 208 over conventional designs for boats of similar size, and may lower a rate of wear on interfacing parts and machinery as well as forming a larger space forward of the propulsion machinery (main propulsion unit 206, transmission 210 and propeller shaft 208) than for conventional in-line, inboard configurations. Additionally, due to reductions in the angle and length of the rod, the main propulsion unit 206 may consume less fuel, due to more efficient energy transfer.

Figure 5:
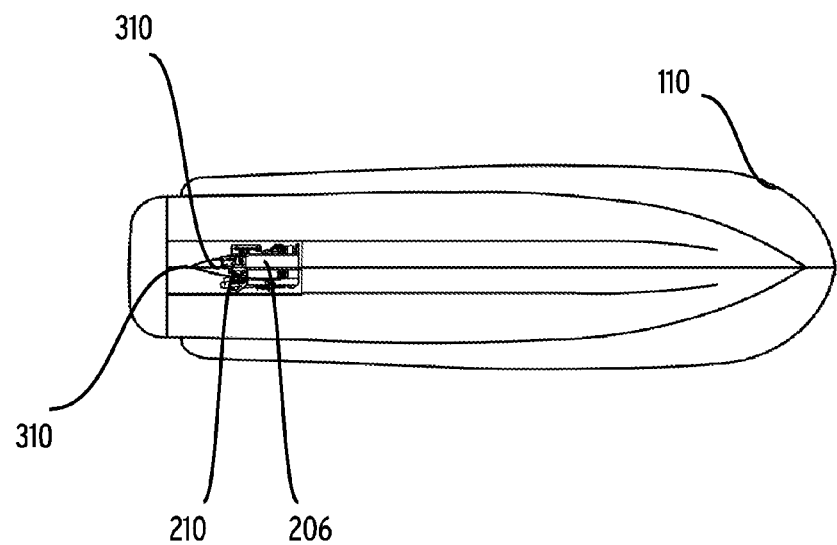
FIG. 5 illustrates a view of a hull 110 embodiment with the superstructure and decking removed to demonstrate the position of the main propulsion unit 206, transmission 210 and propeller shaft 208 within the enhanced keel pad sectional 310.

FIG. 5 provides an overhead view of the vessel hull 110 with the superstructure and decking removed to demonstrate the position of the main propulsion unit 206, transmission 210 and propeller shaft 208 within the enhanced keel pad sectional 310.

The further aft placement of the propulsion machinery relative to conventional designs creates more open space in the central area of the boat, possibly for storage. The enhanced keel pad sectional 310 also improves an angle of the propeller shaft 208 in relation to the main propulsion unit 206 and the transmission 210, improving energy transfer efficiency. A more conventional approach would re-locate the propulsion machinery closer to the water in the hull, for example in an area created by a hull protrusion under the boat. Another conventional approach would be to increase the size of the boat overall to achieve an increase in cabin space. The described embodiments take neither of these approaches.

Figure 6:
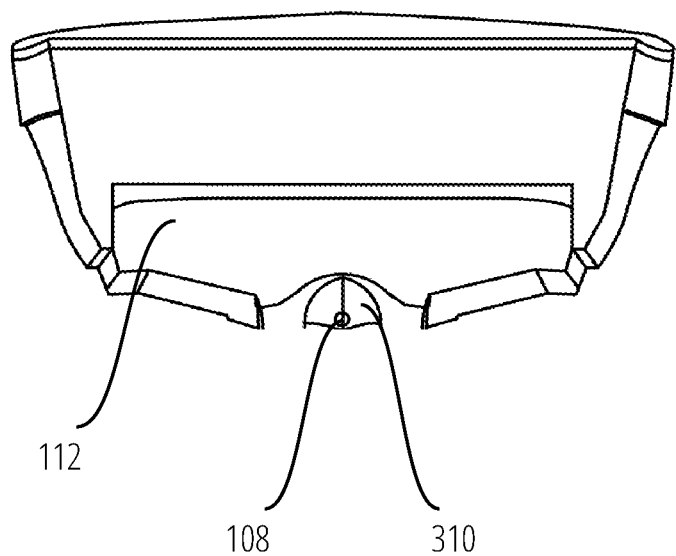
FIG. 6 illustrates a view of the enhanced keel pad sectional 310 and propeller shaft tunnel 108 from the vessel transom 112.

FIG. 6 provides a view of an embodiment of an enhanced keel pad sectional 310 and propeller shaft tunnel 108 from the vessel transom 112 of the vessel.

Figure 7:
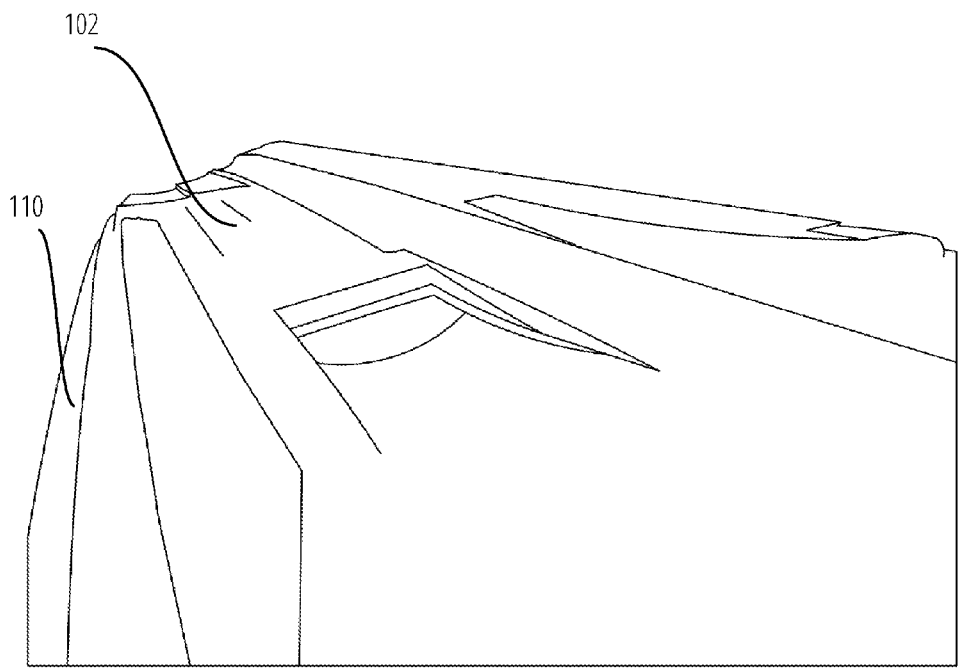
FIG. 7 illustrates one aspect of a hull 110 embodiment from the perspective of looking down along the planing surfaces 102.

FIG. 7 illustrates one aspect of the hull 110: (from the perspective of looking down along the planing surfaces 102). The keel pad 104, just beyond the step 106, is extended in a rounded shape.

Conventional design practice for boat hulls would suggest that a greater area beyond the step 106 would lead to greater friction. However, an unexpected result of the rounded design combined with the form of the enhanced keel pad sectional 310 overall is to generate a greater flow of bubbles to the keel pad 104, while simultaneously increasing water flow in the propeller shaft tunnel 108. Conventional practice would also suggest enlarging the size of each keel pad 104, instead of extending and rounding it. Conventional design principles would further suggest forming a sharper edged step 106, for example a triangular formation, to improve streamlining and improve stability.

Figure 8:
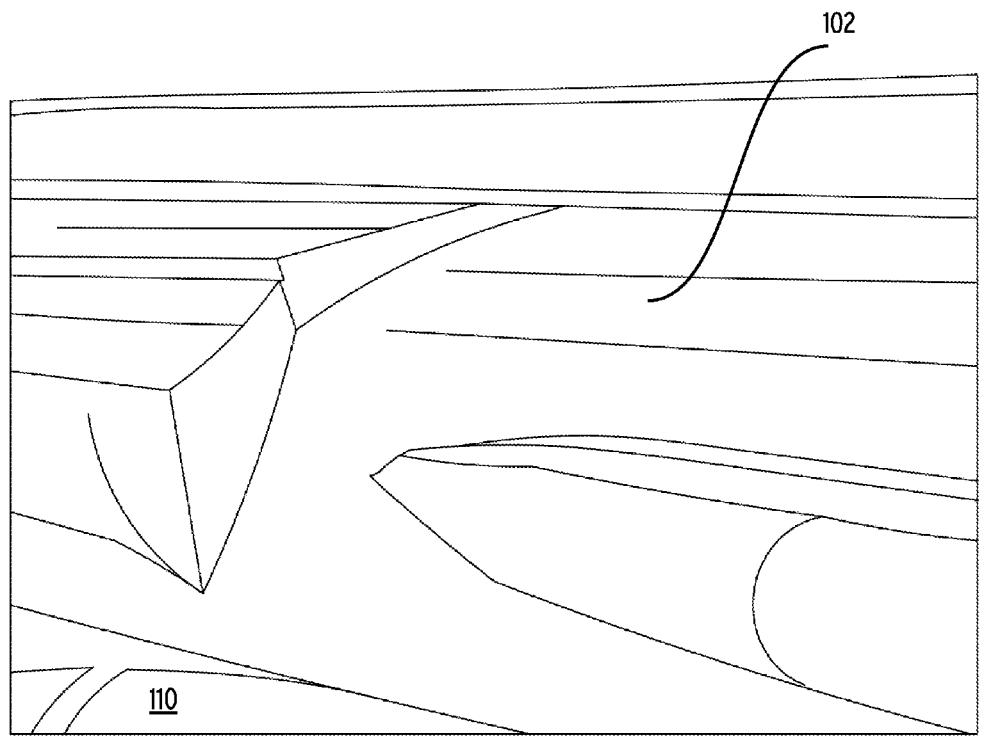
FIG. 8 illustrates a close up view of a step transition near the fore of a hull 110 down to the planing surfaces 102.

FIG. 8 illustrates a close up view of a step transition near the fore of the hull 110 down to the planing surfaces 102.

Figure 9:
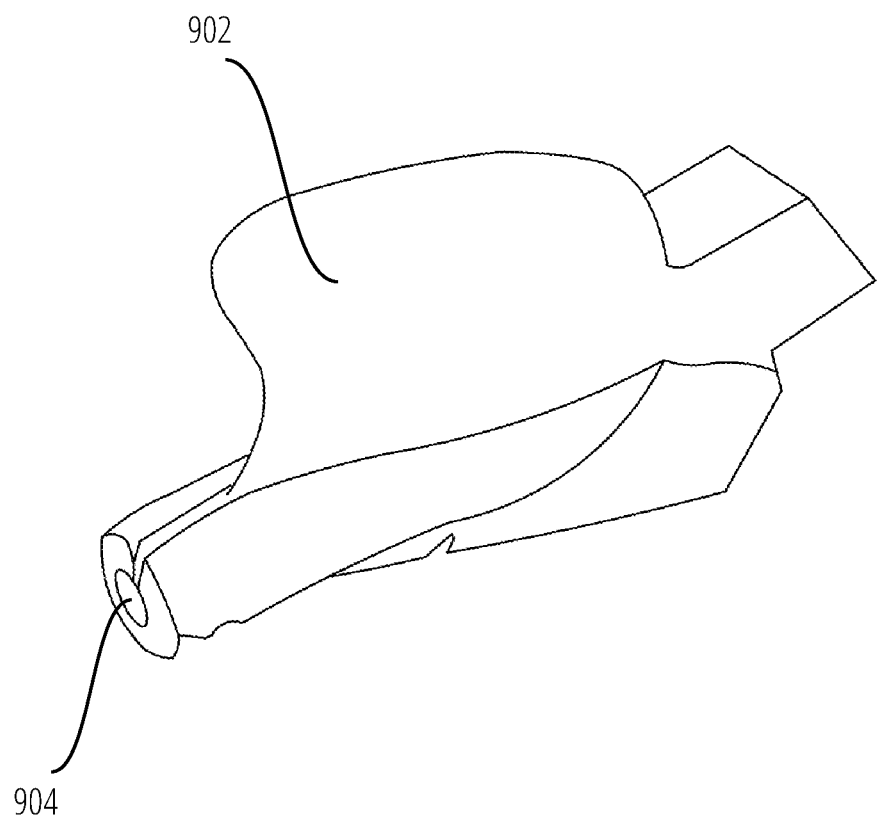
FIG. 9 illustrates a removable keel fin 902 that can be placed either on or off of the enhanced keel pad sectional 310.

FIG. 9 illustrates a removable keel fin 902. The propeller shaft 208 may extend through the removable keel fin 902 via a propeller shaft bore 904 to form an efficient angle of engagement with the water.

Figure 10:
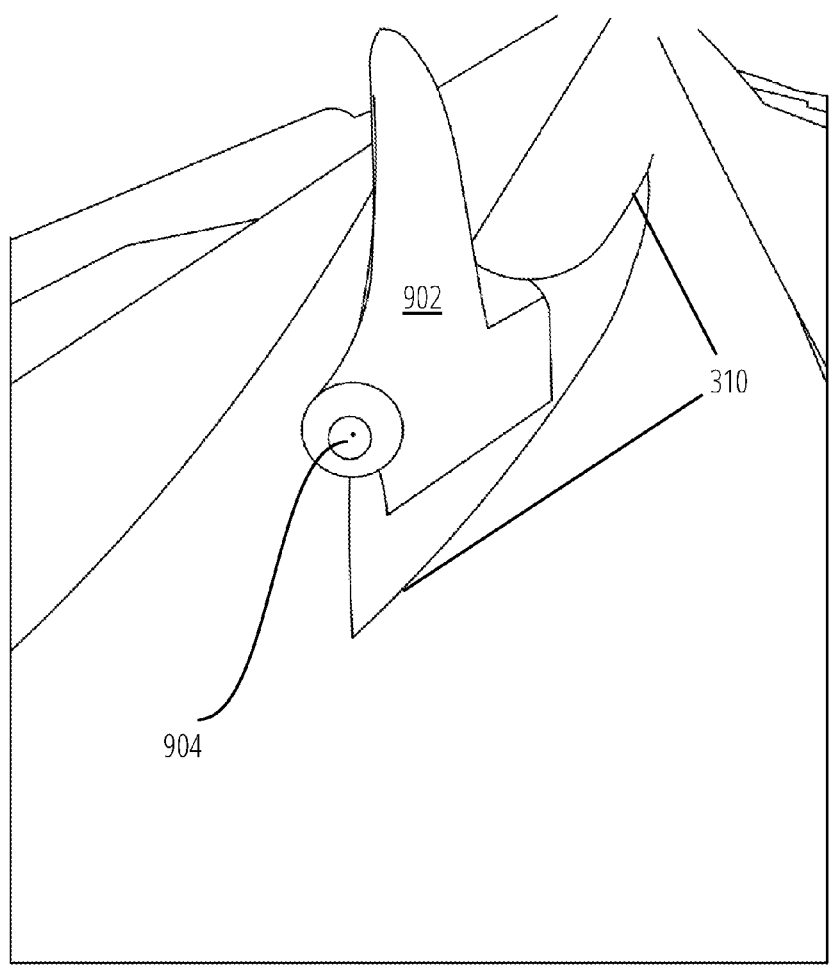
FIG. 10 illustrates the removable keel fin 902 (with the propeller shaft tunnel 108 shown) when it is attached to the enhanced keel pad sectional 310, with the keel pad 104 for reference.

FIG. 10 illustrates the removable keel fin 902 when it is attached to the enhanced keel pad sectional 310, with the keel pad 104 for reference.

The shape of the removable keel fin 902 enables the propeller shaft 208 to extend inside and through the propeller shaft bore 904, maintaining an efficient angle for propulsion.

Figure 11:
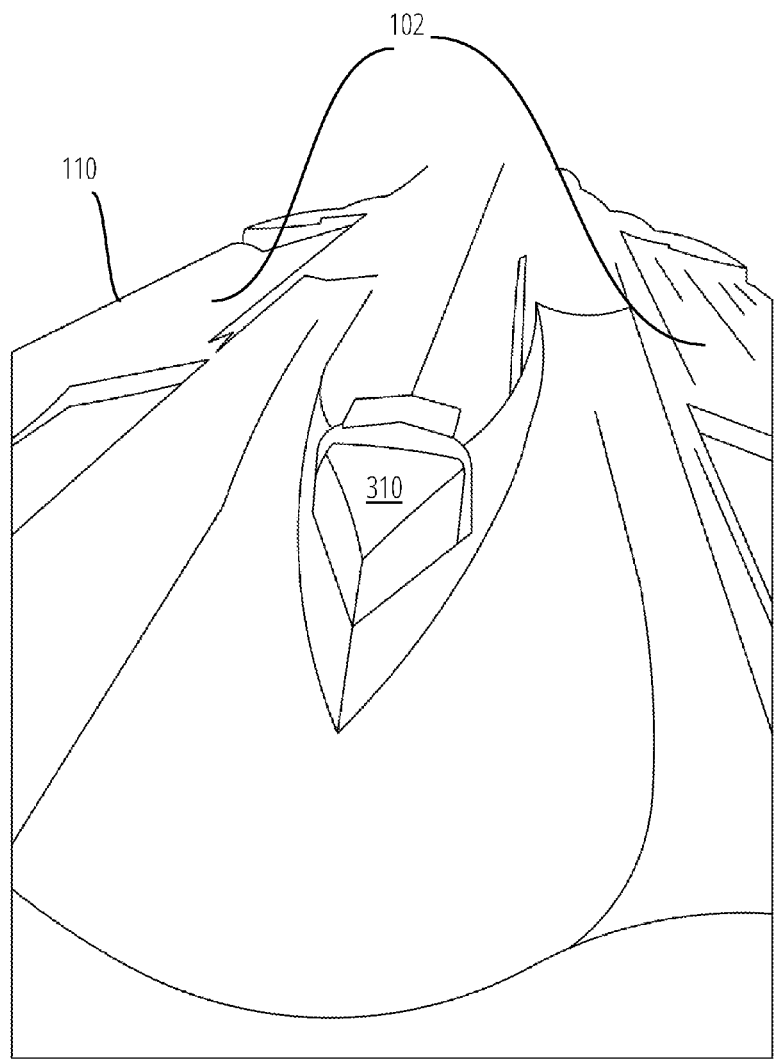
FIG. 11 illustrates a top view of a hull 110 from above the vessel transom 112.
Figure 12:
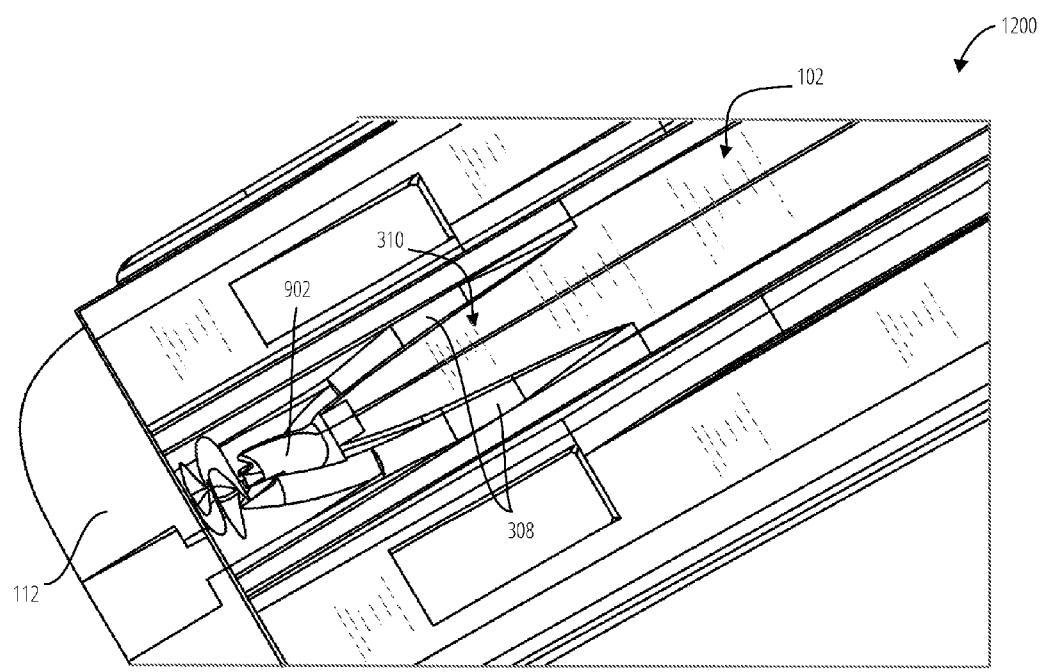
FIG. 12 illustrates a bottom view 1200 of a hull 110.
Figure 13:
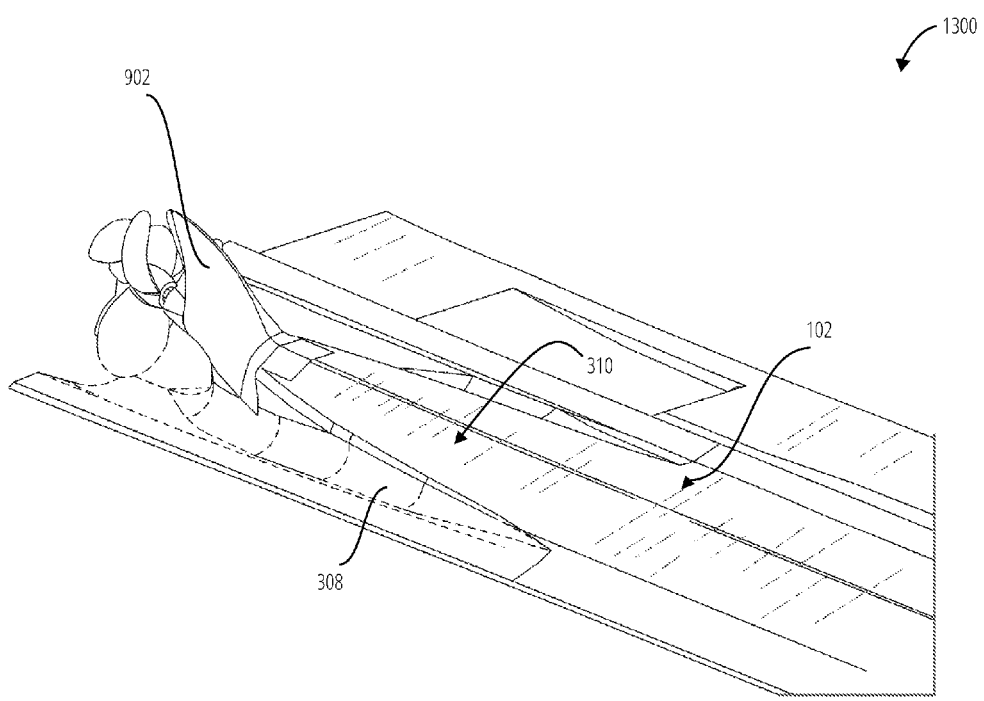
FIG. 13 illustrates a bottom perspective view 1300 of a hull 110.

FIG. 11 illustrates a top view of the boat hull 110 from just above the vessel transom 112. The planing surfaces 102 and each keel pad 104 are shown for reference.

Underneath the area of the enhanced keel pad sectional 310 lies the propulsion machinery (main propulsion unit

206, transmission 210 and propeller shaft 208). The unusual reshaping of the aft end of the hull 110 would seemingly leave less area to introduce hydroplaning of the hull 110, However, an unexpected result is improved aft area for the propulsion machinery that also forces a greater amount of water into the propeller shaft tunnel, maintaining hydroplaning efficiency.

Conventionally to achieve a comparable level of efficiency the described embodiments achieve, one would either decrease an overall size of the vessel, or sacrifice inner storage. Alternatively, in order to achieve a comparable level of storage space, one would enlarge the vessel and sacrifice both efficiency and speed capability.

What is claimed is:

1. A hull of an aquatic vessel, the hull comprising:
 a keel pad sectional extended from a hull planing surface to a location on the hull at which a propeller shaft exits a propeller shaft tunnel at an aft transom edge of the hull; and
 the keel pad sectional comprising a tapered element formed within and coplanar with the hull planing surface, the tapered element extending from the hull planing surface to a point that positions a propeller at the aft transom edge of the aquatic vessel, wherein edges of the tapered element are concave forming directional ports that, when the aquatic vessel is in forward motion, increase a flow of water into the location on the hull at which the propeller shaft exits the propeller shaft tunnel.

2. The hull of claim 1, the directional ports formed to direct the flow of water around the tapered element on both port and starboard sides of the aquatic vessel.

3. The hull of claim 1, the keel pad sectional dimensioned within an approximately ⅓ middle width section of a bottom of the hull.

* * * * *